S. GODFREY.
Grinding Mill.
No. 53,603.
Patented April 3, 1866.
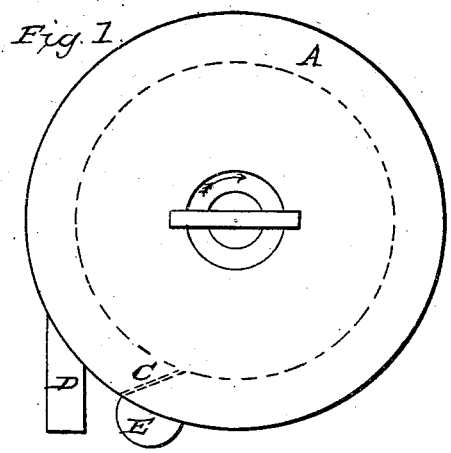
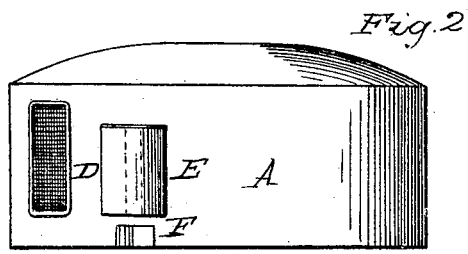
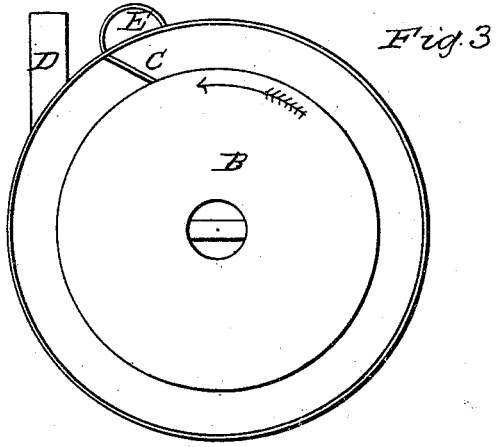

UNITED STATES PATENT OFFICE.

SOLOMON GODFREY, OF PEORIA, ILLINOIS.

IMPROVEMENT IN GRINDING-MILLS.

Specification forming part of Letters Patent No. 53,603, dated April 3, 1866.

*To all whom it may concern:*

Be it known that I, SOLOMON GODFREY, of Peoria, in the county of Peoria and State of Illinois, have invented a new and useful Improvement in Cooling Flour as Ground at the Stones; and I do hereby declare that the following is a full, clear, and exact description of the construction and operation of the same, reference being had to the annexed drawings, making a part of this specification, in which—

Figure 1 is a plan view. Fig. 2 is a view in elevation; and Fig. 3 is a view of Fig. 1 reversed, all of said views showing my improvement as applied to the rim and upper or runner millstone.

It is the object of my invention to cool the flour at the stones as it is ground, and to prevent the clogging of the flour and choking of the stones by dissipating the moisture that is usually the cause of these effects; and to this end my invention consists in forming a fixed flange on the rim that surrounds the runner and making an opening in front and rear of this flange, so that the motion of the runner will cause a current of air to enter at the opening behind the flange, and to be expelled at the opening before the flange and escape with the flour.

To the rim A, which surrounds and covers the runner B, I attach securely a flange, C, placed at a tangent. This flange passes vertically from the bottom to very near or quite to the top of the inside of the rim A, and is situated so near the edge of the runner as only not to be touched by it in its rotation. Behind the flange C, I place an opening, D, which may be a short square trough or a tube with a wire-gauze screen over its outer end to exclude dust and impurities, or the opening may be directly in the rim without the trough or tube, but covered with the screen. In front of the flange C, I place in the rim a second opening, E, having a close cover and situated over the trough F, through which the flour escapes. The rim, to make my invention most effective, should have an opening on the top no larger than is absolutely necessary for the admission of the grain to be ground and the rattle-staff.

As the runner rotates in the direction of the red arrow its motion will induce a current of fresh air to enter behind the flange through the opening D in a continuous stream, which will be expelled at the opening E before the flange with the ground flour, and thus cool the flour and keep the runner cool, and carry off all the moisture from the grain and prevent all that formation of the doughy or pasty mass which the heat generated and moisture devoloped in the common modes of grinding always produces, and which more or less rapidly clogs the stones and chokes the escape of the flour in a uniform manner from between them.

What I claim as my invention, and desire to secure by Letters Patent, is—

The combination of the openings D and E, and the flange C, with the rim A and the runner, substantially in the manner and for the purpose described.

In testimony whereof I have hereunto subscribed my name.

SOLOMON GODFREY.

Witnesses:
  EDM. F. BROWN,
  JOS. I. PEYTON.